United States Patent [19]

Wszolek et al.

[11] 3,951,691

[45] Apr. 20, 1976

[54] WETTABLE BATTERY SEPARATOR AND PROCESS THEREFOR

[75] Inventors: Walter R. Wszolek, Sykesville; Joseph A. Cogliano, Baltimore, both of Md.

[73] Assignee: W. R. Grace & Co., New York, N.Y.

[22] Filed: Oct. 7, 1974

[21] Appl. No.: 512,372

[52] U.S. Cl. ............................. 136/144; 136/146; 136/148
[51] Int. Cl.$^2$ ..................... H01M 2/16; H01M 2/00
[58] Field of Search ................... 136/144, 146, 148; 264/136, 137

[56] References Cited
UNITED STATES PATENTS

| | | | |
|---|---|---|---|
| 3,595,698 | 7/1971 | Kordesch | 136/146 |
| 3,615,865 | 10/1971 | Wetherell | 136/146 |
| 3,629,161 | 12/1971 | Paine | 136/148 |
| 3,811,957 | 5/1974 | Buntin | 136/148 |

*Primary Examiner*—John H. Mack
*Assistant Examiner*—H. A. Feeley
*Attorney, Agent, or Firm*—Richard P. Plunkett; Kenneth E. Prince

[57] ABSTRACT

This invention relates to a process for imparting permanent wettability to a battery separator comprising a non-woven mat of polyolefin fiber by impregnating said battery separator with an $\alpha$-olefin/$\alpha,\beta$-unsaturated acid or anhydride copolymer or terpolymer dissolved in water by reaction with a base and thereafter causing the copolymer or terpolymer to revert to a water-insoluble substantially free acid form by either heating the impregnated battery separator to drive off the base or exposing the impregnated separator to acid. Water-insoluble herein refers to aqueous media having a pH from acidic to essentially neutral.

6 Claims, No Drawings

WETTABLE BATTERY SEPARATOR AND PROCESS THEREFOR

The present invention is directed to a process for producing a wettable battery separator formed from non-woven mats of polyolefin fibers and the battery separator resulting therefrom. More particularly the present invention is preferably directed to impregnating a non-woven mat of polyolefin fibers with an $\alpha$-olefin/ $\alpha,\beta$-unsaturated acid or anhydride copolymer or terpolymer dissolved in water by reaction with a base and thereafter causing the copolymer or terpolymer to revert to a water-insoluble substantially free acid form by either heating the impregnated separator to drive off the base or exposing the impregnated separator to acid. Herein water-insoluble refers to aqueous media having a pH ranging from acidic to essentially neutral.

Battery separators produced from non-woven webs of polyolefins, specifically polypropylene, are well known in the art. Patents directed to their formation and wettability include but are not limited to U.S. Pat. Nos. 3,002,040; 3,026,366; 3,045,058; 3,055,966; 3,084,091; 3,092,438; 3,216,864; 3,314,821; 3,351,495; 3,354,247; 3,615,995; 3,755,523 and 3,773,590. Thus although there is much prior art on the formation of non-woven webs from polyolefins, which polyolefins have a predominance of the best physical and chemical characteristics for the formation of a battery separator, there is still one problem which precludes or curtails such use. That is, the polyolefins employed as battery separators for the most part have a high degree of non-polarity. This non-polarity characteristic greatly hinders their operability since it diminishes and often time precludes the acid electrolyte from wetting its surface thereby hindering the flow of ions to their proper electrodes.

One object of the instant invention is to produce a battery separator formed from non-woven mats of polyolefin fibers which are readily wettable in acid electrolytes. Another object of the instant invention is to produce a process for making a battery separator formed from non-woven mats of polyolefin fibers wettable.

The above and other objects of the instant invention, which will be apparent from a reading hereinafter, are accomplished by impregnating a battery separator formed from non-woven mats of polyolefin fibers with an $\alpha$-olefin/$\alpha,\beta$-unsaturated acid or anhydride copolymer or terpolymer dissolved in water by reaction with a base and thereafter causing the copolymer to revert to a water-insoluble substantially free acid form by either heating the impregnated battery separator to drive off the base or exposing the impregnated separator to acid. As used herein the term "water-insoluble" refers to aqueous media having a pH ranging from acidic to essentially neutral.

In practicing the instant invention it is necessary that the copolymer or terpolymer be put into aqueous solution, emulsion or dispersion form so that it may be impregnated into the non-woven mat of polyolefin fibers. In order to do this it is necessary that the copolymer or terpolymer forms a water soluble salt which will then impregnate the polyolefin fibers. After the polyolefin fibers are impregnated, the copolymer or terpolymer is reverted to a water-insoluble free acid by either heating the impregnated battery separator of polyolefin fibers to drive off the base, e.g. ammonia or other volatile organic amine or in the case where the base is a nonvolatile organic amine, an inorganic alkaline earth base or alkali metal base by merely exposing the impregnated separator to an acid bath or to the acid solution in the battery itself.

As aforestated, battery separators formed from a non-woven mat of polyolefin fiber can be made in various ways. One method of accomplishing this is set out in U.S. Pat. No. 3,773,590. That is polypropylene, preferably in pellet or crumb form, is added to a hopper and fed to an extruder wherein it is heated at temperatures in the range 620°–800°F. After thermal treatment, the polypropylene is forced through the extruder by a drive motor into the die head, which head may contain a heating plate. The polypropylene is then forced out a row of die openings in the die head into a gas stream which attenuates the polypropylene into fibers. The gas stream which attentuates the polypropylene is supplied through gas jets, said gas being a hot gas, preferably air. The flow of the gas is controlled to between 0.7 and 4 pounds per minute, thus producing polypropylene fibers having an average diameter between 1 to about 10 microns. The thus formed fibers are collected as a self-supporting mat on a collecting device such as a rotating drum. The mat produced by the melt blowing process has a basis weight of between 60 and 500 grams per square meter and a thickness which may vary between 20 and 200 mils. To produce a battery separator from the non-woven mat produced by the melt blowing process, the mat must be compacted to obtain the desired thickness and porosity as well as the mechanical properties of strength and abrasion resistance. The non-woven mat is compacted to a thickness of between about 10 and 40 mils, preferably by means of a thermal compacting operation using calender rolls or a press to obtain the non-woven mat of fixed thickness. The non-woven mat can then be ribbed by conventional means such as by extrusion or embossing. Ribs extruded onto the mat can be of either the same material as the mat or other thermal plastic polymers and said ribs can be either solid or of foam structure as shown in U.S Pat. No. 3,773,590.

Various polyolefins are operable herein as battery separators and include but are not limited to polypropylene, polyethylene, ethylene-butene copolymers, ethylene-propylene copolymers, ethylene-propylene terpolymers, e.g. ethylene-propylene and a minor amount of a nonconjugated diene such as a cyclic or aliphatic diene, e.g. hexadiene, dicyclopentadiene, ethylidene norbornene; synthetic rubbers and the like.

The thus formed polyolefin web of the instant invention prior to impregnation with the copolymer or terpolymer has pore sizes less than 40 microns in the web, which size is eminently suitable for use as a battery separator.

The $\alpha$-olefin/$\alpha,\beta$-unsaturated acid or anhydride copolymers or terpolymers operable herein include, but are not limited to, ethylene/acrylic acid copolymer; ethylene/propylene/acrylic acid terpolymer; propylene/acrylic acid copolymer; ethylene/methacrylic acid copolymer; propylene/methacrylic acid copolymer; ethylene/maleic anhydride; styrene/maliec anhydride and the like. Additionally ionomers such as those commercially available from Dupont under the tradename "Surlyn A", i.e. random ethylene-methacrylic acid copolymer containing about 88% ethylene units, 5% methacrylic acid units and 7% sodium methacrylate units wherein the mole ratio of —COOH to —COONa is 1 and "Surlyn D" i.e., a high molecular weight interpolymer of ethylene, sodium methacrylate and methacrylic acid and the like, are also operable herein. When using these ionomers it may be necessary in some cases to add additional base for optimum results. Thus the α-olefin/α,β-unsaturated acid or anhydride copolymer or terpolymer prior to the impregnation step are commercially available as either a solid, dispersion or emulsion. When this material is in solid form it is preferred that it is in a size range of −100 mesh to facilitate the material goint into solution. However larger particles are operable herein but require longer periods to go into solution.

The amount of copolymer impregnated into the polyolefin web can vary between wide limits. Amounts ranging from about 0.2% up to 30% are operable herein. Amounts in excess of about 30% tend to have a diminishing return since although they improve wettability they decrease porosity thereby hindering the flow of the electrolyte.

In the impregnation step whereby the polyolefin web is dipped, sprayed or otherwise coated or impregnated with the copolymer or terpolymer, any commercially available anionic or nonionic surfactant such as an aqueous solution of dioctyl sodium sulfosuccinate can be added to the base solution to decrease surface tension and improve wettability, if desired. However, such addition is not necessary and the invention is operable without same.

The concentration of the copolymer or terpolymer dissolved in water by reaction with a base can be varied between wide limits. Thus a base solution of an α-olefin/α,β-unsaturated acid or anhydride copolymer or terpolymer wherein the copolymer or terpolymer concentration ranges from about 0.5 to 33% by weight is operable herein. Higher concentrations are operable but ordinarily are unnecessary.

The copolymer or terpolymer impregnant of the instant invention consists of a hydrophobic (α-olefinic) portion and a hydrophilic (α,β-unsaturated acid or anhydride) portion. The amount of each portion can vary considerably. For wettability it is preferred that the hydrophobic (α-olefinic) portion be of sufficient molecular weight to insure that the molecules will become entangled with those of the non-woven web of α-olefin fibers of the battery separator thereby maintaining the impregnant in situ. The hydrophilic (acrylic acid) portion should be present in an amount sufficient to cause wettability of the battery separator by the electrolyte. It has been found that α-olefin/α,β-unsaturated acid or anhydride copolymers or terpolymers containing about 5 to about 80 weight percent α,α,β-unsaturated acid or anhydride are operable herein to cause good wettability of battery separators comprising a non-woven mat of polyolefinic fiber.

For purposes of explanation this invention will be set out example-wise using an ethylene/acrylic acid copolymer as the impregnant and ammonium hydroxide as the base to impregnate a polypropylene battery separator. However as aforestated, various other materials are operable herein.

The following examples will explain but expressly not limit the instant invention. Unless otherwise noted, all parts and percentages are by weight.

EXAMPLE I

To a Chemco reactor equipped with high speed stirrer and heating coil was charged 400 g. of distilled water, 50 g. of ammonium hydroxide (28.8% NH$_3$) and 50 g. of particulate (−100 mesh) of commercially available ethylene/acrylic acid copolymer (20% acrylic acid) having a density of 0.950 g./cc. and a melt index of 0.3. The reactor was sealed and stirring was carried out for 5 minutes without heating. Heat was then applied with stirring until the temperature reached 95°C at which temperature the reaction was continued for ½ hour with stirring. The reactor was cooled and the ammonical solution of the ethylene/acrylic acid copolymer was removed. The solution had a pH of 10.4. This 12.4% solids solution will hereinafter be referred to as copolymer solution A.

EXAMPLE II

A portion of solution A from Example I was admixed with 934 grams of water with high speed stirring. This 4.1% solids solution will hereinafter be referred to as copolymer solution B.

EXAMPLE III

A portion of solution A from Example I was admixed with 5634 grams of water with high speed stirring. This 1.0% solids solution will hereinafter be referred to as copolymer solution C.

EXAMPLE IV

Non-woven polypropylene mats were produced by the melt-blowing process set out herein and in U.S. Pat. No. 3,773,590 under the following conditions:

| Polypropylene resin | 33.6 melt flow rate |
|---|---|
| Die Temp. °F | 580 |
| Air Temp. °F | 644 |
| Polymer Rate gm/min | 7.9 |
| Air rate lbs./min. | 1.27 |
| Collector distance in. | 6.0 |
| RPM | 1.0 |

The resultant polypropylene fibers in the mats had a diameter of 2 microns or less. The basis weight of mats varied from 256–270 gr./meter$^2$. The thus formed mats were compacted on a heated calender to a thickness of 21 mils.

EXAMPLE V

Polypropylene mats from Example IV (6 inch × 8 inch) were immersed in solutions A, B & C from Examples I, II and III after 1.25 weight percent of a surfactant, i.e. an ester of a sulfonated dicarboxylic acid commercially available from American Cyanamid Co. under the tradename "Aerosol OT" had been added to each of the solutions. After 3 minutes the mats were removed, drained dry and heated in an oven for 1 hour at 75°C to drive off the ammonia and insolubilize the impregnated copolymer on the polypropylene mat. The mat immersed in copolymer solution A had a dry weight percent pick-up of 18.4%, the mat immersed in copolymer solution B had a dry weight percent pick-up of 6.7% and the mat immersed in copolymer solution C had a dry weight percent pick-up of 2.3%.

The mats were then tested subjectively for wettability by immersion in 1.25 specific gravity H$_2$SO$_4$ maintained at 65°C for 2½ hours. The mat in copolymer solution A had excellent wettability, the mat in copolymer solution B had very good wettability and the mat in copolymer solution C showed good wettability.

The mat is copolymer solution A had an electrical resistance of 1.6 milliohms/mil.

A polypropylene mat from Example IV which had not been subjected to impregnation as set out in the instant example had poor wettability and when tested had an almost infinite electrical resistance.

What is claimed is:

1. A process for imparting permanent wettability to a battery separator comprising a non-woven mat of polyolefin fiber which comprises impregnating said mat with 0.2 to 30% by weight of an α-olefin/α,β-unsaturated acid or anhydride copolymer, said copolymer containing about 5 to about 80 weight percent α,β-unsaturated acid or anhydride and being dissolved in an amount ranging from 0.5% to 33% by weight in an aqueous base and thereafter regenerating the copolymer to a water-insoluble, substantially free acid form by volatilization or neutralization of the base.

2. The process according to claim 1 wherein the polyolefin fiber is polypropylene.

3. The process according to claim 1 wherein the copolymer is an ethylene/acrylic acid copolymer.

4. A battery separator comprising a non-woven mat of polyolefin fiber impregnated with 0.2 to 30% by weight of an α-olefin/α,β-unsaturated acid or anhydride copolymer said copolymer comprises about 5 to about 80 weight percent α,β-unsaturated acid or anhydride.

5. The battery separator according to claim 4 wherein the polyolefin fiber is polypropylene.

6. The battery separator according to claim 4 wherein the copolymer is an ethylene/acrylic acid copolymer.

* * * * *